United States Patent
Mitsuhashi et al.

(10) Patent No.: US 7,237,053 B1
(45) Date of Patent: Jun. 26, 2007

(54) CLOCK SWITCHING CIRCUIT FOR A HOT PLUG

(75) Inventors: Masato Mitsuhashi, Kawasaki (JP); Yoshiyuki Shirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 09/713,024

(22) Filed: Nov. 16, 2000

(30) Foreign Application Priority Data

Jan. 28, 2000 (JP) .............................. 2000-020904

(51) Int. Cl.
 *G06F 13/00* (2006.01)
(52) U.S. Cl. ...................................... 710/302; 713/600
(58) Field of Classification Search ................ 710/100, 710/300, 302, 52, 60, 104, 305, 316, 61; 713/400, 600, 501, 320; 326/93, 104, 62; 327/99, 100, 144, 145, 147, 158; 375/357, 375/376, 377
See application file for complete search history.

(56) References Cited

U.S. PATENT DOCUMENTS

| | | | |
|---|---|---|---|
| 5,187,615 A | | 2/1993 | Miyazawa et al. |
| 5,373,537 A | * | 12/1994 | Oberhauser et al. ........ 375/357 |
| 5,410,571 A | * | 4/1995 | Yonekawa et al. .......... 375/376 |
| 5,533,072 A | * | 7/1996 | Georgiou et al. ........... 375/371 |
| 5,550,860 A | * | 8/1996 | Georgiou et al. ........... 375/220 |
| 5,553,100 A | * | 9/1996 | Saban et al. ................. 375/340 |
| 5,579,353 A | * | 11/1996 | Parmenter et al. .......... 375/376 |
| 5,652,536 A | * | 7/1997 | Nookala et al. ............. 327/298 |
| 5,694,176 A | * | 12/1997 | Bruette et al. ................. 725/43 |
| 5,784,598 A | * | 7/1998 | Griffith ....................... 713/501 |
| 5,809,291 A | * | 9/1998 | Munoz-Bustamante et al. ........................... 713/501 |
| 5,815,016 A | * | 9/1998 | Erickson ..................... 327/158 |
| 5,821,781 A | * | 10/1998 | Rigazio ......................... 327/99 |
| 5,877,636 A | * | 3/1999 | Truong et al. ................. 327/99 |
| 6,009,531 A | * | 12/1999 | Selvidge et al. ............ 713/400 |
| 6,069,899 A | * | 5/2000 | Foley .......................... 370/494 |
| 6,075,392 A | * | 6/2000 | Sandner ....................... 327/145 |
| 6,134,621 A | * | 10/2000 | Kelley et al. ............... 710/311 |
| 6,249,149 B1 | * | 6/2001 | Pedersen ....................... 326/93 |
| 6,253,267 B1 | * | 6/2001 | Kim et al. ................... 710/302 |
| 6,266,780 B1 | * | 7/2001 | Grundvig et al. ........... 713/501 |

(Continued)

FOREIGN PATENT DOCUMENTS

KR          0032939          1/1990

(Continued)

OTHER PUBLICATIONS

Morris Mano, "Computer System Architecture", 1982, Prentice-Hall, Inc., 2nd Ed., pp. 21-25.*

(Continued)

*Primary Examiner*—Khanh Dang
(74) *Attorney, Agent, or Firm*—Arent Fox LLC

(57) ABSTRACT

One aspect of the present invention is a clock switching circuit for switching between asynchronous first clock and second clock when connecting or disconnecting an interface cable having a hot-plug function. The clock switching circuit includes a first group of flip-flops for receiving an interface disconnection signal that corresponds to disconnection and connection of the interface cable in response to the first clock, and a second group of flip-flops for receiving the interface disconnection signal in response to the second clock.

3 Claims, 9 Drawing Sheets

U.S. PATENT DOCUMENTS

| | | | | |
|---|---|---|---|---|
| 6,308,233 B1 * | 10/2001 | Park | ............................ | 710/302 |
| 6,345,328 B1 * | 2/2002 | Rozario et al. | ................ | 710/52 |
| 6,346,830 B1 * | 2/2002 | Ishikawa | ..................... | 326/93 |
| 6,349,387 B1 * | 2/2002 | Blomgren et al. | ........... | 713/501 |
| 6,411,134 B1 * | 6/2002 | Manz et al. | ................... | 327/99 |
| 6,438,697 B2 * | 8/2002 | Atkinson | ..................... | 713/320 |
| 6,453,425 B1 * | 9/2002 | Hede et al. | .................. | 713/501 |
| 6,456,146 B1 * | 9/2002 | Darmon et al. | .............. | 327/407 |
| 6,484,222 B1 * | 11/2002 | Olson et al. | ................. | 710/300 |
| 6,496,050 B2 * | 12/2002 | Lloyd | ........................... | 327/407 |
| 6,501,304 B1 * | 12/2002 | Boerstler et al. | .............. | 327/99 |
| 6,564,279 B1 * | 5/2003 | Neil et al. | ................... | 710/302 |
| 6,567,489 B1 * | 5/2003 | Glover | ........................ | 375/376 |
| 6,611,537 B1 * | 8/2003 | Edens et al. | ................. | 370/503 |
| 6,657,464 B1 * | 12/2003 | Balardeta et al. | ............ | 327/147 |
| 6,744,323 B1 * | 6/2004 | Moyal et al. | ................. | 331/1 A |
| 6,788,347 B1 * | 9/2004 | Kim et al. | ................... | 348/441 |

FOREIGN PATENT DOCUMENTS

| | | |
|---|---|---|
| KR | 0034702 | 2/1990 |
| KR | 0058168 | 9/1992 |
| KR | 1996-5342 | 2/1996 |

OTHER PUBLICATIONS

TechEncyclopieia, Defenition for "phase locked", TechWeb, http://www.techweb.com/encyclopedia/defineterm?term=phaselocked&exact=1.*

Tony Van Roon, "Phase-Locked Loops", http://www.uoguelph.ca/~antoon/gadgets/pll/pll.html.*

* cited by examiner

To connection

CLOCK SWITCHING CIRCUIT FOR A HOT PLUG

BACKGROUND OF THE INVENTION

1. Field of the Invention

This invention relates to a clock switching circuit for switching the internal clock for an interface having a hot-plug function such as IEEE1394 or USB, and more particularly to a clock switching circuit that prevents the occurrence of hazards during switching, makes it possible to generate a stable clock, and prevents malfunction of the internal circuits.

2. Related Art

Recent personal computers perform the connection with peripheral devices by an interface having a hot-plug function. A hot-plug function is a function that activates the connection even when an interface cable is connected after the power to the computer and peripheral device have been turned ON. For example, when an interface cable having a hot-plug function is connected to the device to be connected after the personal computer has started up, the connection with that connected device is activated, and when the interface cable is disconnected, the connection with the connected device is deactivated.

When the connection is activated, the internal circuits of the connected device are also activated, and specified high-speed processes, that are controlled by the synchronization clock, are executed. Moreover, after the cable has been disconnected, the connection is deactivated and the internal circuits of the connected device are also deactivated. However, internal circuits continue a minimum of operations for a preparation of the cable connection later.

The aforementioned IEEE1394 interface having a hot-plug function has a high-speed transmission rate of 400 Mbps, and is a suitable interface for transmitting image data. In order to correspond with this interface, the connected device has a PLL circuit which speeds up the oscillating clock of the internal oscillator. Moreover, it is desired that while the connected device is activated, the internal circuits perform a predetermined operation in synchronization with the high-speed clock of the PLL circuit, and while the connected device is not activated, the internal circuits maintain a minimum operation in synchronization with the oscillation clock of the low-speed oscillator.

Therefore, it is necessary for the internal circuits of the connected device to switch between the high-speed clock and the low-speed clock in response to the connection or disconnection of the interface cable. In this case, it is necessary to switch between two clocks that are asynchronous and out of phase with each other. In prior clock switching circuits, it is not possible to adequately prevent the occurrence of hazards when switching.

FIG. 1 is a circuit diagram of a prior clock switching circuit. This clock switching circuit is as disclosed in Japanese Laid-open Patent No. H01-6209309, and is used for switching asynchronous clocks in communication devices. With the switching circuit in FIG. 1, switching is performed by a selection signal 'Select' that selects between the output clock X'tal of a quartz oscillator or the output clock PLL of a PLL circuit. In order to prevent hazards, which are the cause of malfunction when switching between the asynchronous clocks X'tal and PLL, the quartz oscillator clock side comprises flip-flops F/F(1), F/F(2) and an AND gate AND1, and switching is performed in synchronization with the clock X'tal, while the PLL side also comprises flip-flops F/F(3), F/F(4) and an AND gate AND2, and switching is performed in synchronization with the clock PLL.

FIG. 2 is a timing chart of the operation of the clock switching circuit shown in FIG. 1. The selection signal 'Select' is HI-level when the interface cable is disconnected, and is LO-level when the interface cable is connected. FIG. 2 shows the operation when the interface cable changes from being connected to being disconnected, as well as the operation when returning to the connected state.

As shown in FIG. 2, when the selection signal 'Select' is in the LO-level connection state, the clock output COUT of the switching circuit outputs the high-speed clock PLL of the PLL circuit. At that point, when the cable is disconnected and the selection signal 'Select' becomes HI-level, then in response to the fall of the clock X'tal at time t1, the flip-flop F/F(1) receives the HI-level of the selection signal 'Select'. Then, at time t2, in response to the fall of the clock PLL, the flip-flops F/F(3), (4) receive the inverted signal (LO level) of the selection signal 'Select'. In this way, the AND gate AND2 prohibits the output of the clock PLL, and the clock output COUT stops. Furthermore, in response to the fall of the clock X'tal at time t3, the flip-flop F/F(2) transfers the selection signal 'Select', and the AND gate AND1 lets the clock X'tal pass. As a result, the clock output COUT is switched to the quartz oscillator clock X'tal.

In response to the selection signal 'Select' being switched as described above, the deactivated clock is disconnected by one clock operation, and the activated clock is activated by 2 clock operations, and therefore the occurrence of hazards during switching is prevented. Furthermore, the activated clock is activated in synchronization with that clock phase, so there is no occurrence of a hazard that causes malfunction.

FIG. 3 is a different operation timing chart of the clock switching circuit in FIG. 1. In this case, the clock PLL may operate at very high-speed when compared with the clock X'tal. In this example, the frequency of the clock PLL is two times the frequency of the quartz clock X'tal. The HI level of the selection signal 'Select' is received by the flip-flops F/F(3), (4) at time t11, which prohibits output of the high-speed clock PLL, and at time t12, the HI level of the selection signal 'Select' is received by the flip-flop F/F(1), and at the trailing edge of the quartz clock X'tal at time t13, the output of the flip-flop F/F(1) is received by the next stage flip-flop F/F(2), and the AND gate AND1 is opened and the low-speed quartz clock X'tal is output to the output clock COUT.

When the interface cable is connected, the selection signal 'Select' becomes LO-level. This state is received by the flip-flop F/F(3) at time t14, and then received by the next stage flip-flop F/F(4) at the next trailing edge at time t15. However, as described above, since the quartz clock X'tal is half or less the frequency of the high-speed flip-flop PLL, at time t16 after time t15, the flip-flops F/F(1), (2) receive the LO-level selection signal 'Select' when the clock X'tal first falls, and the output of the low-speed quartz clock X'tal is prohibited. However, at the switching inside the circle in the figure, a hazard may occur in the output clock COUT.

The IEEE1394 interface operates at 400 Mbps and is a very high-speed interface, so there is a possibility that the relationship between the PLL circuit clock and the quartz clock may become as shown in FIG. 3. In that case, with the prior clock switching circuit in FIG. 1, there is a possibility that malfunction will occur in the logical circuits in the later stages to which the output clock COUT is supplied.

Furthermore, when the interface cable is connected, the clock is switched from the low-speed quartz clock to the high-speed PLL clock, however, when the PLL circuit that starts operating after switched is unstable after switching, then an unstable clock will be supplied to the later stage circuits and malfunction will occur.

SUMMARY OF THE INVENTION

The objective of this invention is to provide a clock switching circuit that is capable of properly switching asynchronous clocks having a large difference in frequency when disconnecting or connecting an interface cable with a hot-plug function.

Furthermore, another objective of this invention is to provide a clock switching circuit that is capable of, before switching the clock, waiting for the clock of the PLL circuit to become stable after connecting an interface cable with a hot-plug function.

In order to accomplish the aforementioned objectives, one aspect of the present invention is a clock switching circuit for switching between asynchronous first clock and second clock when connecting or disconnecting an interface cable having a hot-plug function, and comprising: a first group of flip-flops for receiving an interface disconnection signal that corresponds to disconnection and connection of the interface cable in response to the first clock; and a second group of flip-flops for receiving the interface disconnection signal in response to the second clock. Furthermore, in this invention, as for the first flip-flop group, the flip-flop of the final stage thereof outputs a first selection signal through the first clock edges whose number is the stage number of the first flip-flop group, when the interface cable is disconnected; and the flip-flop of the final stage thereof outputs a first no-selection signal through one clock edge when the interface cable is connected. Also, the first clock is selected and output in response to the first selection signal, and the output of the first clock is prohibited in response to the first no-selection signal. Moreover, as for the second flip-flop group, the flip-flop of the final stage thereof outputs a second selection signal through the second clock edges whose number is the stage number of the second flip-flop group, when the interface cable is connected; and the flip-flop of the final stage thereof outputs a second no-selection signal through one clock edge when the interface cable is disconnected. The second clock is selected and output in response to the second selection signal, and the output of the second clock is prohibited in response to the second no-selection signal. In this invention, the second flip-flop group has more stages than the first flip-flop group by an amount that corresponds to the relationship between the frequency of the first and second clocks.

With this aspect of the invention, switching to the high-speed second clock is performed by way of the second flip-flop group having more stages, so it is possible to prevent the occurrence of hazards as occurred in the example of the prior art.

In another aspect of the invention, when the interface cable is connected, operation of the PLL circuit starts in response to the interface disconnection signal, and that interface disconnection signal is received by the second flip-flop group after a set amount of time. Also, when the interface cable is disconnected, operation of the PLL circuit stops in response to the interface disconnection signal.

With this aspect of the invention, when switching to the high-speed second clock, it is possible to output the PLL output clock, that has stabilized after a set amount of time, as the second clock. Also, when the interface cable is disconnected, operation of the PLL circuit stops immediately, so it is possible to prevent needless current consumption.

In another aspect of the invention, the number of stages of the second group of flip-flops can be varied according to the external frequency setting signal. In this way, it is possible to provide a clock switching circuit that corresponds to a plurality of types of interface cables.

DESCRIPTION OF THE PREFERRED EMBODIMENTS

The preferred embodiments of the invention is explained in reference to the drawings. However, the technical scope of the invention is not limited to the embodiments described here.

Figure 4:
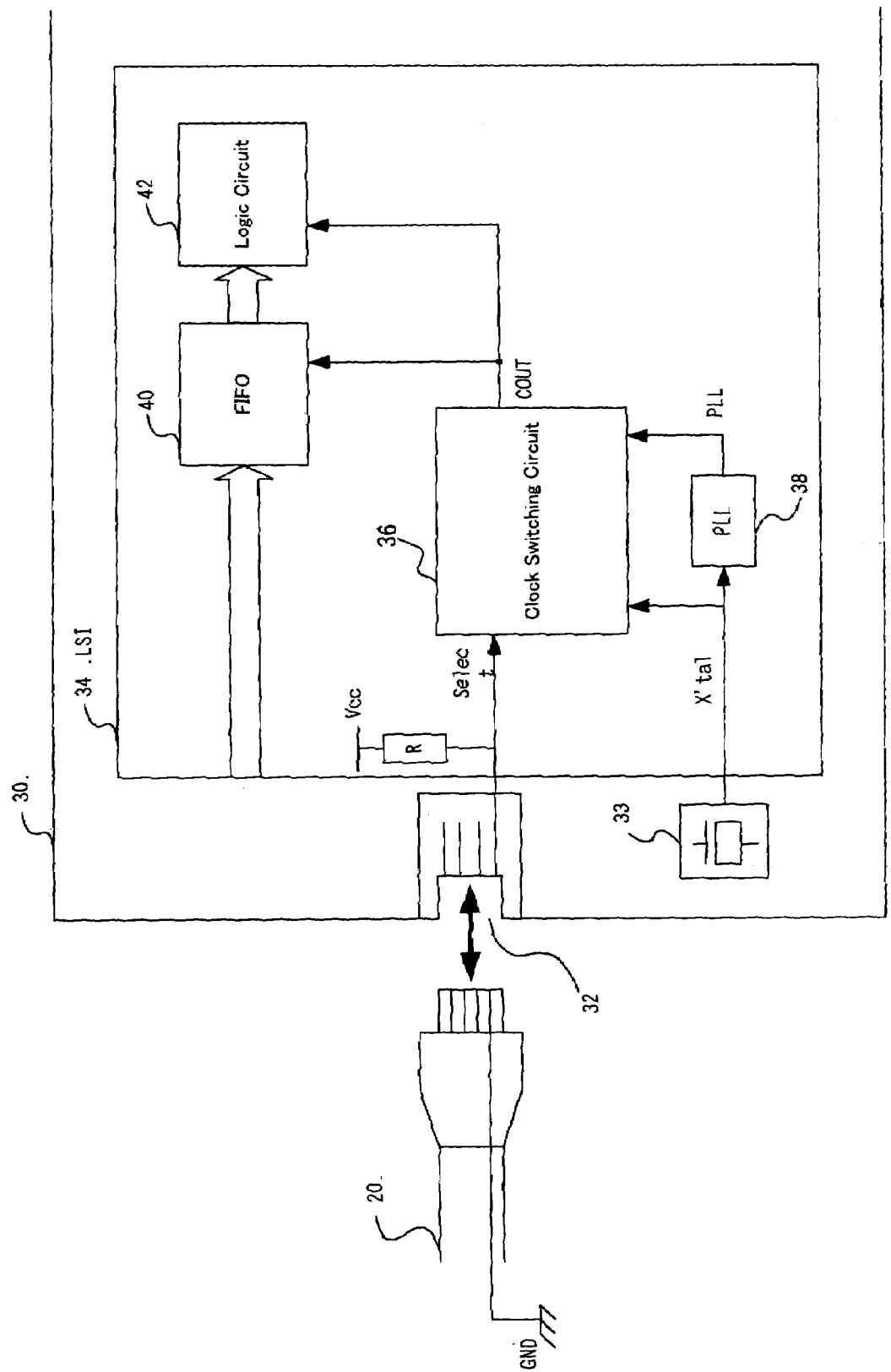
FIG. 4 is a drawing that shows the interface cable and connected device for which an embodiment of the invention is applied.

FIG. 4 shows the interface cable and connected device to which the embodiments of the invention are applied. The interface cable 20 is an interface having a hot-plug function such as IEEE1394 and USB. The connected device 30 to which the interface cable 20 is connected or disconnected has a connector 32 to which the cable is connected. In addition, there is an LSI device 34 inside the connected device 30 for processing the data signals that are supplied from the interface cable 20.

This LSI device 34 comprises a pull-up resistor R for generating a disconnection signal 'Select' to indicate whether the interface cable 20 is connected or disconnected. One end of the pull-up resistor R is connected to the power supply Vcc, and the other end is connected to one pin of the cable. The signal line on the cable side that corresponds to it is connected to ground GND, and when the interface cable 20 is connected, the disconnection signal 'Select' is LO-level, and when the interface cable 20 is disconnected, the disconnection signal 'Select' is HI-level. This disconnection signal 'Select' is supplied to the clock switching circuit 36.

There is a quartz oscillator 33 in the connected device 30 for generating a low-speed quartz clock (first clock) X'tal, and that first clock X'tal is supplied to the clock switching circuit 36 and the PLL circuit 38. The PLL circuit 38 generates a high-speed second clock PLL while activated based on the first clock X'tal.

The clock switching circuit 36 selects either the quartz clock X'tal or the PLL circuit clock PLL according to the disconnection signal 'Select' for the interface cable, and supplies it to the circuits 40, 42 in the later stage as an output clock COUT. The later stage circuits, are for example, an FIFO buffer 40 that supplies data supplied from the interface cable 20 to the later stage, and a logic circuit 42 that processes the supplied data, and these circuits operate by using the clock COUT that is supplied from the clock switching circuit 36 as the operation clock.

Figure 5:
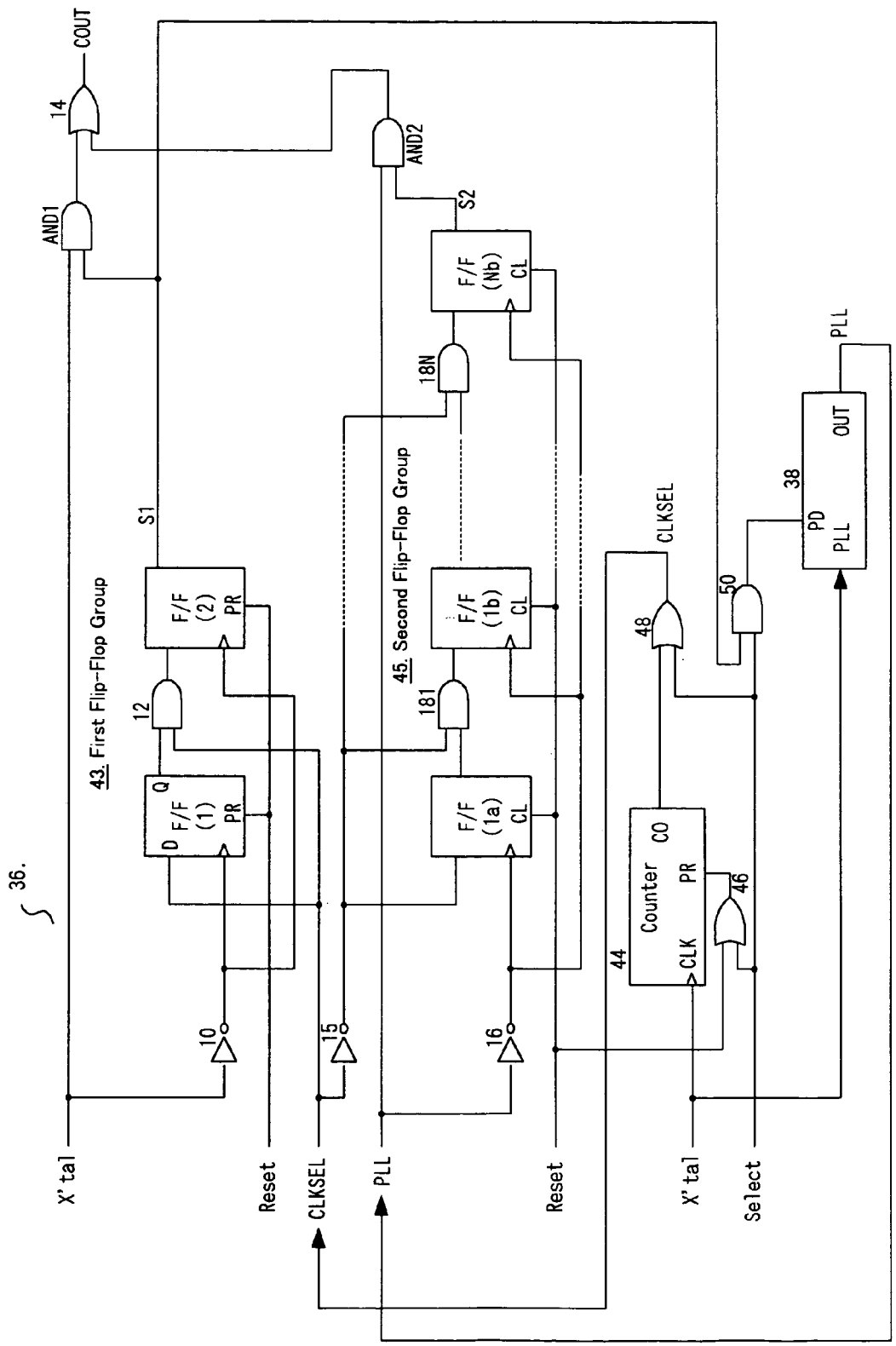
FIG. 5 is a circuit diagram of a clock switching circuit of an embodiment of the invention.
Figure 6:
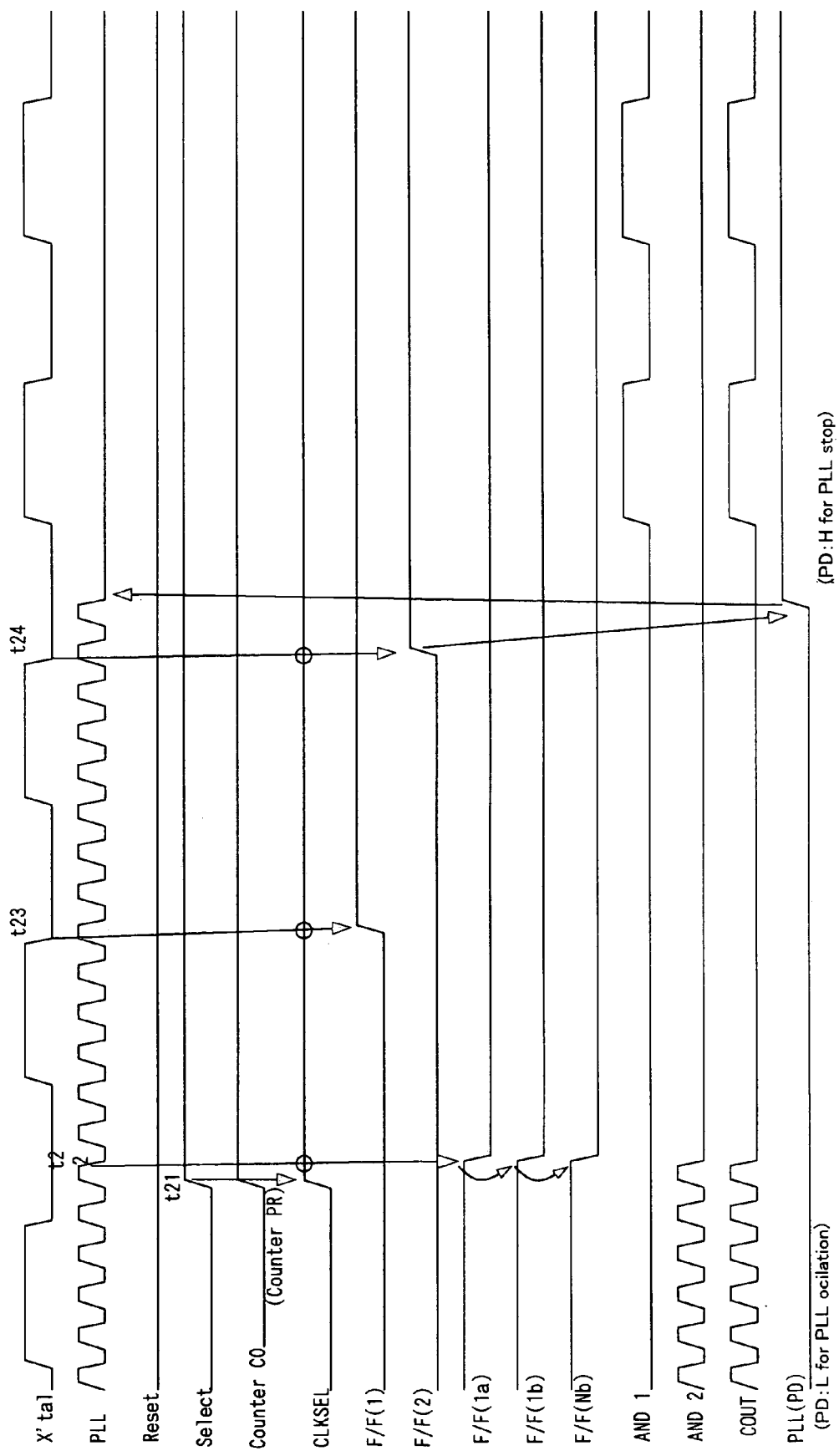
FIG. 6 is a timing chart of the operation in FIG. 5 when the interface cable changed from being connected to disconnected.
Figure 7:
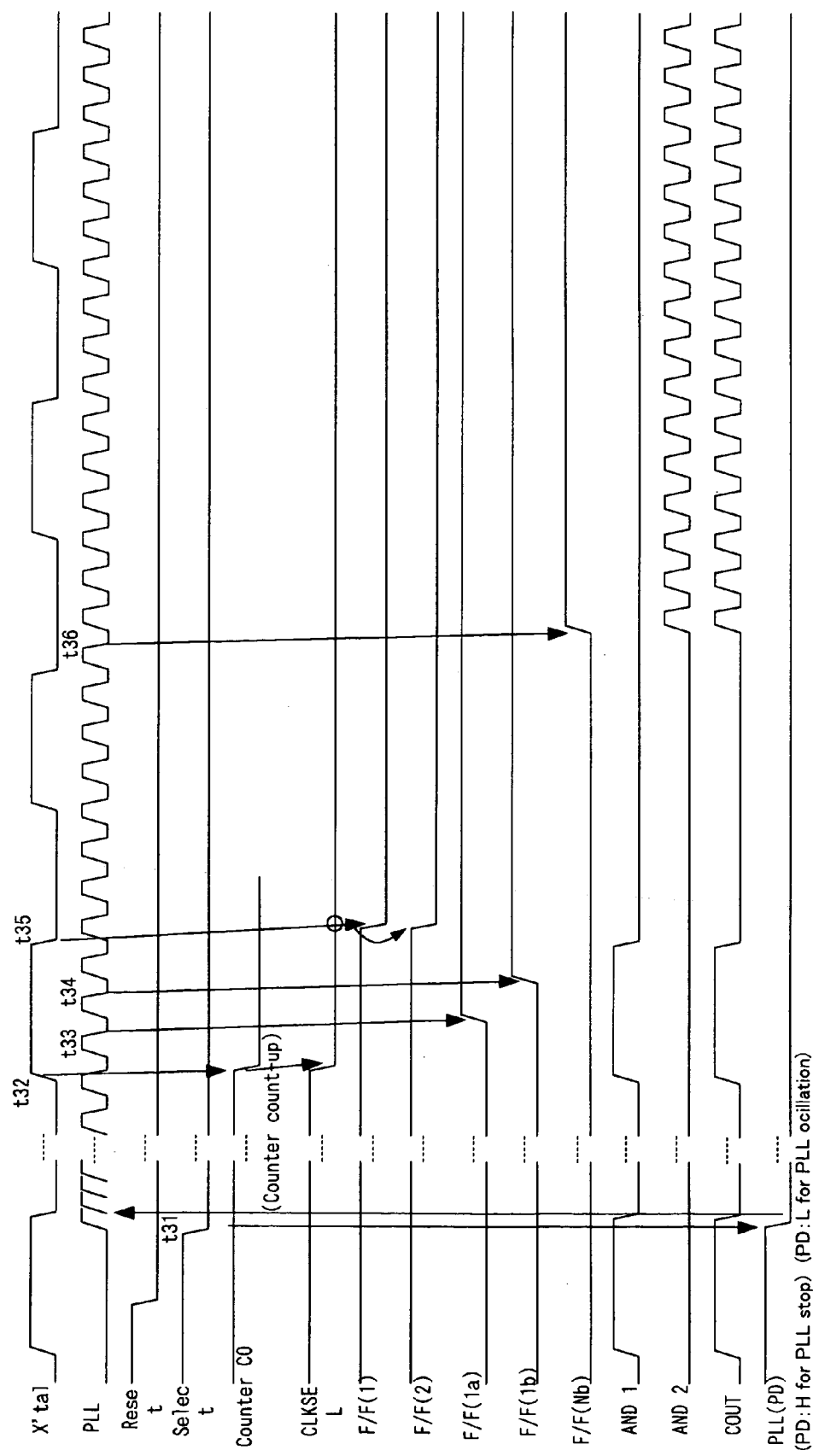
FIG. 7 is a timing chart of the operation in FIG. 5 when the interface cable changed from being disconnected to connected.

FIG. 5 is a circuit diagram of a clock switching circuit of an embodiment of the invention. FIGS. 6 and 7 are timing charts of the operation when the interface cable changes from being connected to disconnected, and from being disconnected to connected, respectively.

The clock switching circuit 36 shown in FIG. 5 comprises a first flip-flop group 43, which selects or does not select the low-speed quartz clock X' tal, a second flip-flop group 45, which selects or does not select the high-speed clock PLL, and a counter 44, which counts a set amount of time after the interface cable 20 is connected until the PLL circuit becomes stable. For convenience, the PLL circuit 38 is also shown in FIG. 5.

Similar to the prior art, the first flip-flop group 43 comprises a two-stage flip-flop F/F (1), (2), and there is an AND gate 12 located between the flip-flops. Furthermore, the first flip-flop group 43 comprises an AND gate AND1 which lets the first clock X'tal pass or stops according to the output S1 of the final-stage flip-flop F/F (2). The two-stage flip-flops F/F (1), (2) receive the HI-level internal disconnection signal CLKSEL in response to the trailing edge of the first clock X' tal when the interface cable is disconnected, and the final-stage flip-flop F/F(2) outputs a first selection signal (HI level) S1 in response to the next trailing edge. In response to this first selection signal S1, the AND gate AND1 lets the first clock X'tal pass.

Moreover, when the interface cable is connected, the final-stage flip-flop F/F(2) receives a LO-level internal disconnection signal CLKSEL by way of the AND gate 12, and outputs a first no-selection signal (LO-level) S1. In response to this first no-selection signal S1, the AND gate AND1 prohibits the first clock X'tal from passing.

As described above, the first flip-flop group 43 generates the first selection signal S1 through greater number, i.g.2, of first clock edges when the interface cable is disconnected, and generates the first no-selection signal S1 through the lesser number of first clock edge when the interface cable is connected. However, this first flip-flop group 43 is not necessarily limited to two flip-flops.

A second flip-flop group 45 comprises more stages of flip-flops F/F than the first flip-flop group 43. This difference in number of stages is set according to the difference in frequencies of the first clock X'tal and the second clock PLL. In the example shown in FIG. 5, the second flip-flop group 45 comprises 2N stages of flip-flops F/F(1a)(1b) to F/F(Na)(Nb). In addition, it comprises AND gates 181 to 18N between the flip-flops, and the AND gate AND2 lets or does not let the second clock PLL pass according to the output S2 of the final-stage flip-flop F/F(Nb).

The internal disconnection signal CLKSEL is received by the flip-flop F/F(1a) by way of an inverter 15. Moreover, when the interface cable is disconnected, the inverted signal (LO level) of the internal disconnection signal CLKSEL is received by the final-stage flip-flop F/F(Nb) by way of the AND gate 18N, and by a second no-selection signal S2, the AND gate AND2 prohibits the second clock PLL from passing. On the other hand, when the interface cable is connected, the inverted signal (HI level) of the internal disconnection signal CLKSEL is received by the first-stage flip-flop F/F(1a), and in response to the trailing edge of the clock PLL, it is transferred to the next stage respectively. Moreover, after the trailing edge of the 2Nth clock PLL, the final-stage flip-flop F/F(Nb) outputs a second selection signal S2 (HI level), and the AND gate AND2 lets the second clock PLL pass.

When the interface cable is connected, the disconnection signal 'Select' become LO level and the PLL circuit 38 is activated and the counter 44 starts counting the leading edges of the quartz clock X'tal. And after a set number, it set the output CO to LO level and sets the internal connection signal CLKSEL to LO level. At that time the PLL circuit outputs the steady high-speed second clock PLL. On the other hand, when the interface is disconnected, the disconnection signal 'Select' becomes HI level, the PLL circuit is deactivated and stops the generation of the second clock PLL. Also, the counter 44 is preset by way of a NOR gate 46, and the output CO, as well as the internal disconnection signal CLKSEL, become HI level.

As described above, when the interface cable is connected, the PLL circuit 38 becomes activated, and the counter 44 counts until the PLL circuit becomes stable. And after it becomes stable, the internal disconnection signal CLKSEL becomes a LO-level connection state. When the interface cable is disconnected, the internal disconnection signal CLKSEL immediately become a HI-level connection state, and the PLL circuit is deactivated in response to the trailing edge of the first clock X'tal.

The operation when the interface cable changes from being connected to disconnected will be explained using FIG. 6. At time t21, the interface cable changes from being connected to disconnected. When this happens, the connection signal 'Select' changes to HI level. In response to this, the internal disconnection signal CLKSEL becomes HI level. Together with this change, the final-stage flip-flop F/F(Nb) outputs the LO-level second no-selection signal S2 in response to the trailing edge of the second clock PLL at time t22, and the AND gate AND2 prohibits output of the second clock PLL.

In response to the trailing edge of the first clock X'tal at time t23, the first-stage flip-flop F/F(1) receives the HI-level internal disconnection signal CLKSEL, and in response to the next trailing edge of the first clock at time t24, the final-stage flip-flopF/F(2) receives the internal disconnection signal CLKSEL, and the first selection signal S1 is set to HI level. When this happens, the first clock X'tal passes the AND gate AND1, and the output clock COUT outputs the first clock. Moreover, in response to the HI-level first selection signal S1, the output of the AND gate 50 becomes HI, and the PLL circuit 38 is set to the deactivated state and stops.

Next, the operation during when the interface cable changes from being disconnected to connected will be explained using Fix. 7. When the interface cable changes to the connected state at time t31, the disconnection signal 'Select' becomes LO level. Due to this LO level, the counter 44 changes from the preset state to the count state, and then it starts to count the first clock X'tal. The leading edges of the first clock X'tal are counted and at time t32, the counter 44 outputs LO-level output CO. When this happens, the internal disconnection signal CLKSEL is set to the LO-level connection state. Also, the PLL circuit 38 is activated (no-power-down state) by the LO-level of the disconnection signal 'Select', and generation of the second clock PLL starts. In other words, the high-speed second clock PLL is generated based on the quartz clock X'tal.

When the internal connection signal CLKSEL becomes LO-level, that inverted signal is received by the first-stage flip-flop F/F(1a) in response to the trailing edge of the second clock PLL at time t33. Furthermore, in response to the trailing edge at time t34, the signal is transferred to the second-stage flip-flop (1b), in response to the trailing edge at time t36, the signal is transferred to the final-stage flip-flopF/F(Nb), and the second selection signal S2 (HI level) is output.

Before the final-stage flip-flop output the second selection signal S2, the first-stage and second-stage flip-flops F/F(1), (2) receive the internal connection signal CLKSEL in response to the trailing edge of the first clock X'tal, and outputs the first no-selection signal S1 (LO level), and output of the first clock X'tal is prohibited. Also, after a specified dead zone, the second clock PLL passes through the AND gate AND2 at time t36, and is output as the output clock COUT.

As described above, when the interface cable is connected, the PLL circuit that was deactivated becomes activated, and when the second clock PLL, that has become stable after a set time, is output, the internal disconnection signal CLKSEL is set to the connection state (HI level). In response to this internal disconnection signal CLKSEL, first, the first flip-flop group 43 stops output of the first clock X'tal, and then the second flip-flop group 45 having larger stages than the first group 43, starts output of the high-speed second clock PLL. Therefore, switching to the stable second clock can be performed with no occurrence of hazards.

Figure 8:
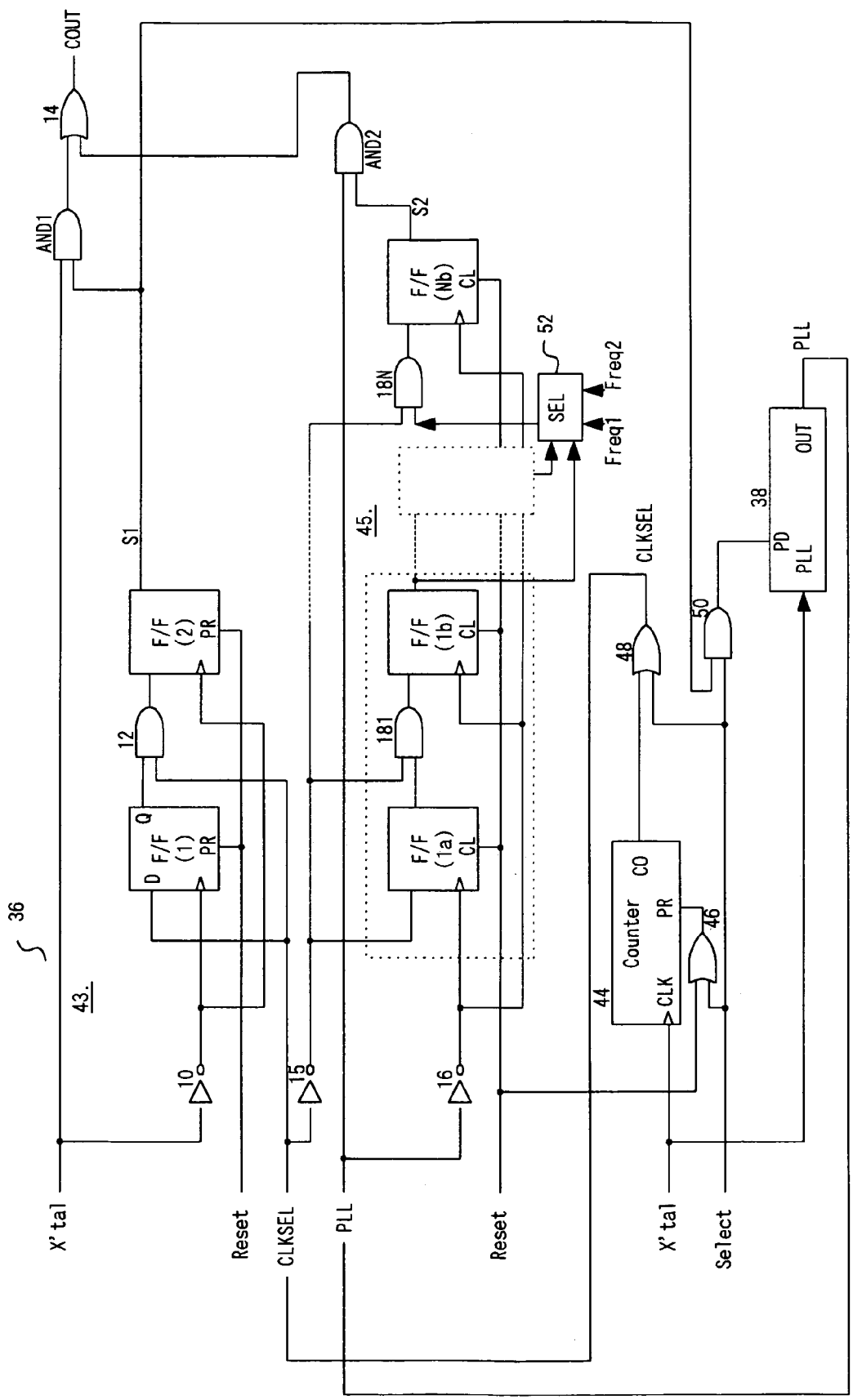
FIG. 8 is a circuit diagram of a clock switching circuit of a second embodiment of the invention.

FIG. 8 is a circuit diagram of the clock switching circuit in a second embodiment of the invention. The same reference numbers are used as were used in FIG. 5. The clock switching circuit 36 in FIG. 8 is different from the circuit shown in FIG. 5 in that the number of stages of the second flip-flop group 45 can be changed according to the frequency selection signals Freq1,2. In order to accomplish this, there is a stage-number selection circuit 52 in the clock switching circuit 36 shown in FIG. 8.

Figure 9:
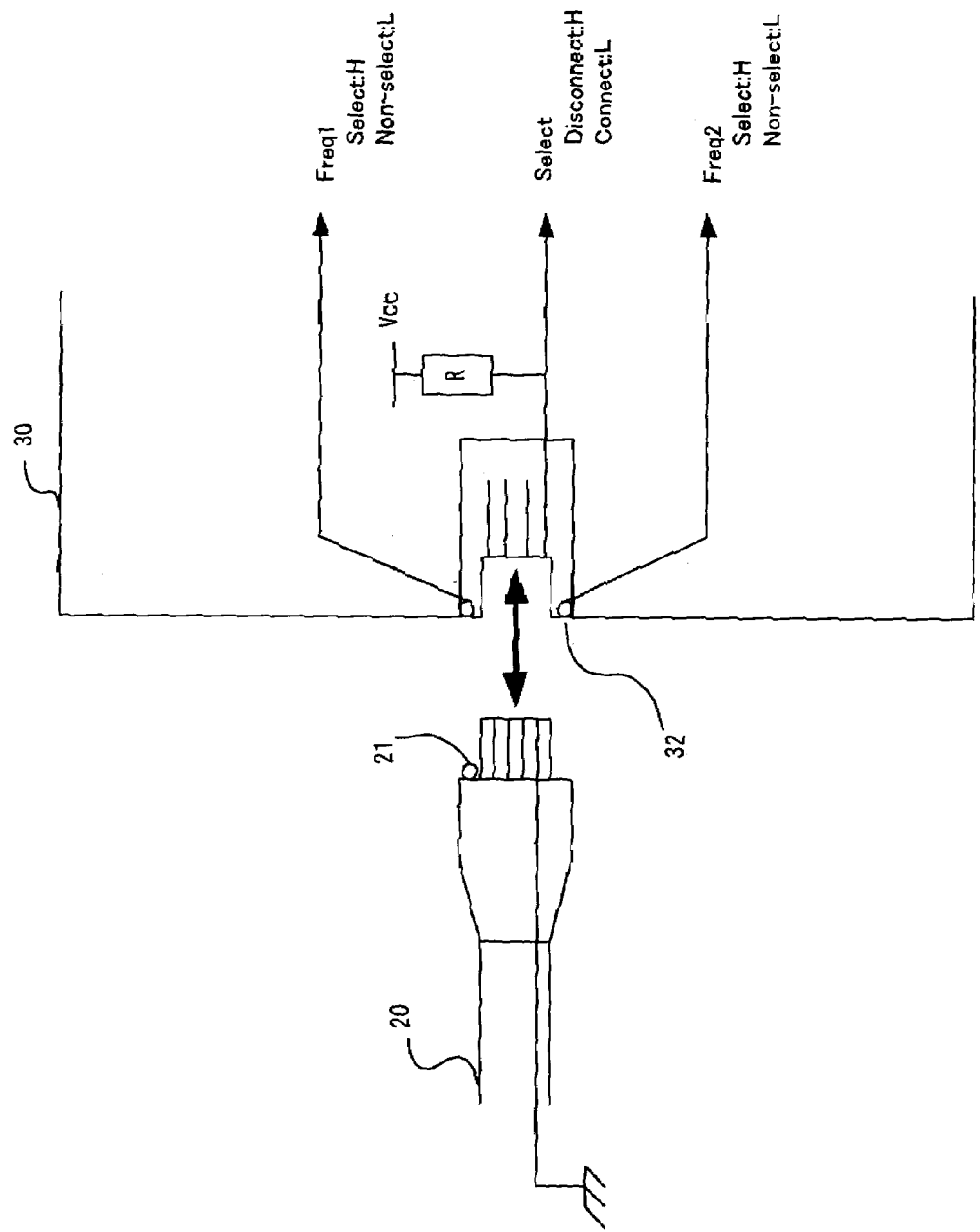
FIG. 9 is a drawing showing the relationship between the interface cable and the connected device in a second embodiment of the invention.

FIG. 9 shows the relationship between the interface cable and connected device in the second embodiment of the invention. In this embodiment, there is a switch 21 in the interface cable 20 that corresponds to the operating frequency of the interface. In the embodiment shown in FIG. 9, this switch is set to the top position, so the frequency selection signal Freq1 is selected. In addition, the selection circuit 52 selects a signal from the greater number of stages and supplies it to the AND gate 18N. The operation at that time is the same as for the first embodiment.

Figure 1:
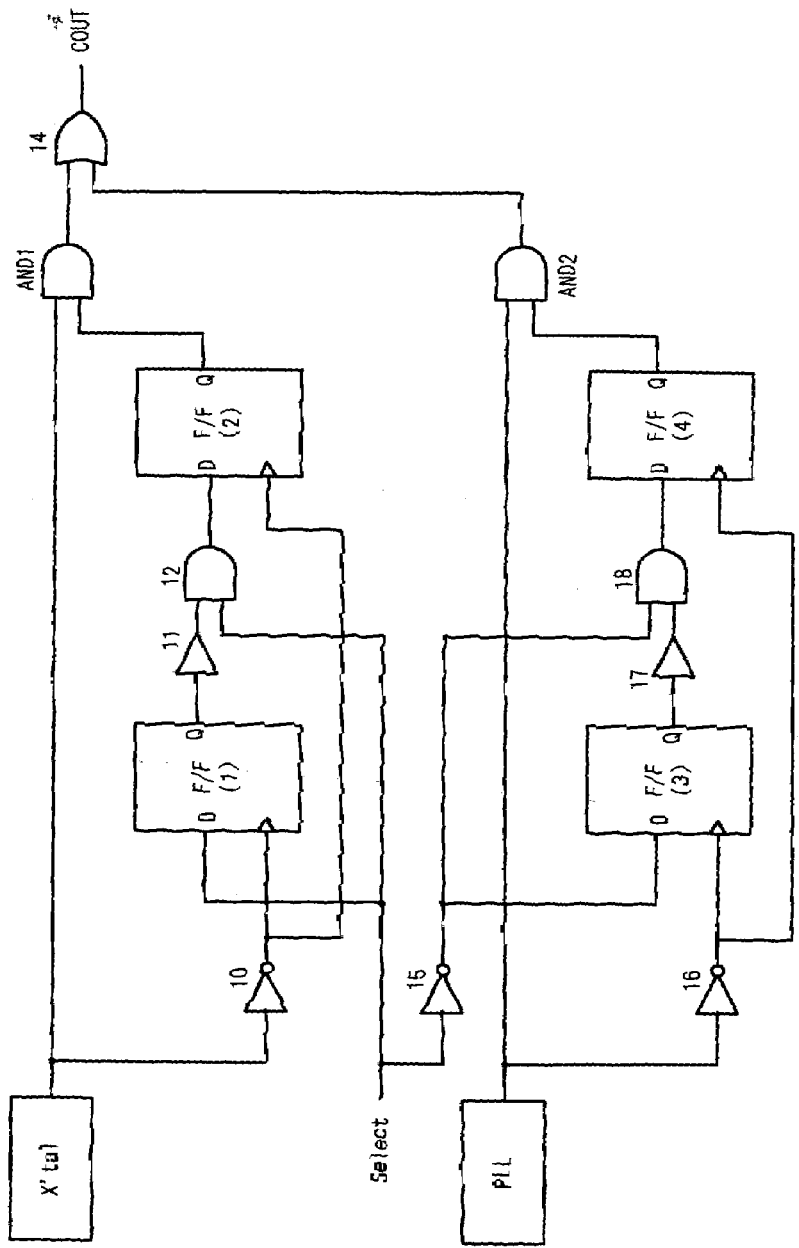
FIG. 1 is a circuit diagram of a prior clock switching circuit.
Figure 2:
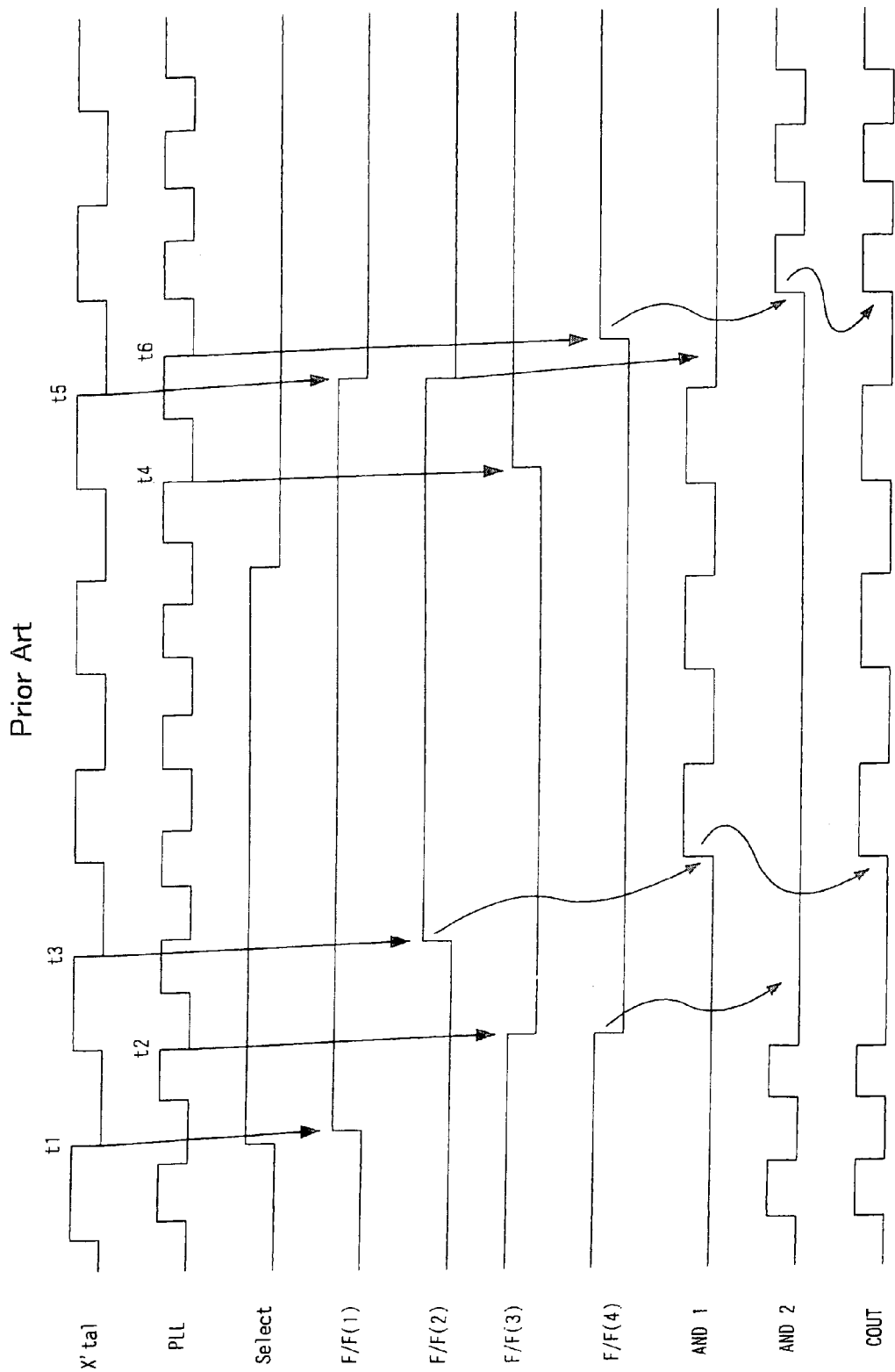
FIG. 2 is a timing chart of the operation of the clock switching circuit in FIG. 1.
Figure 3:
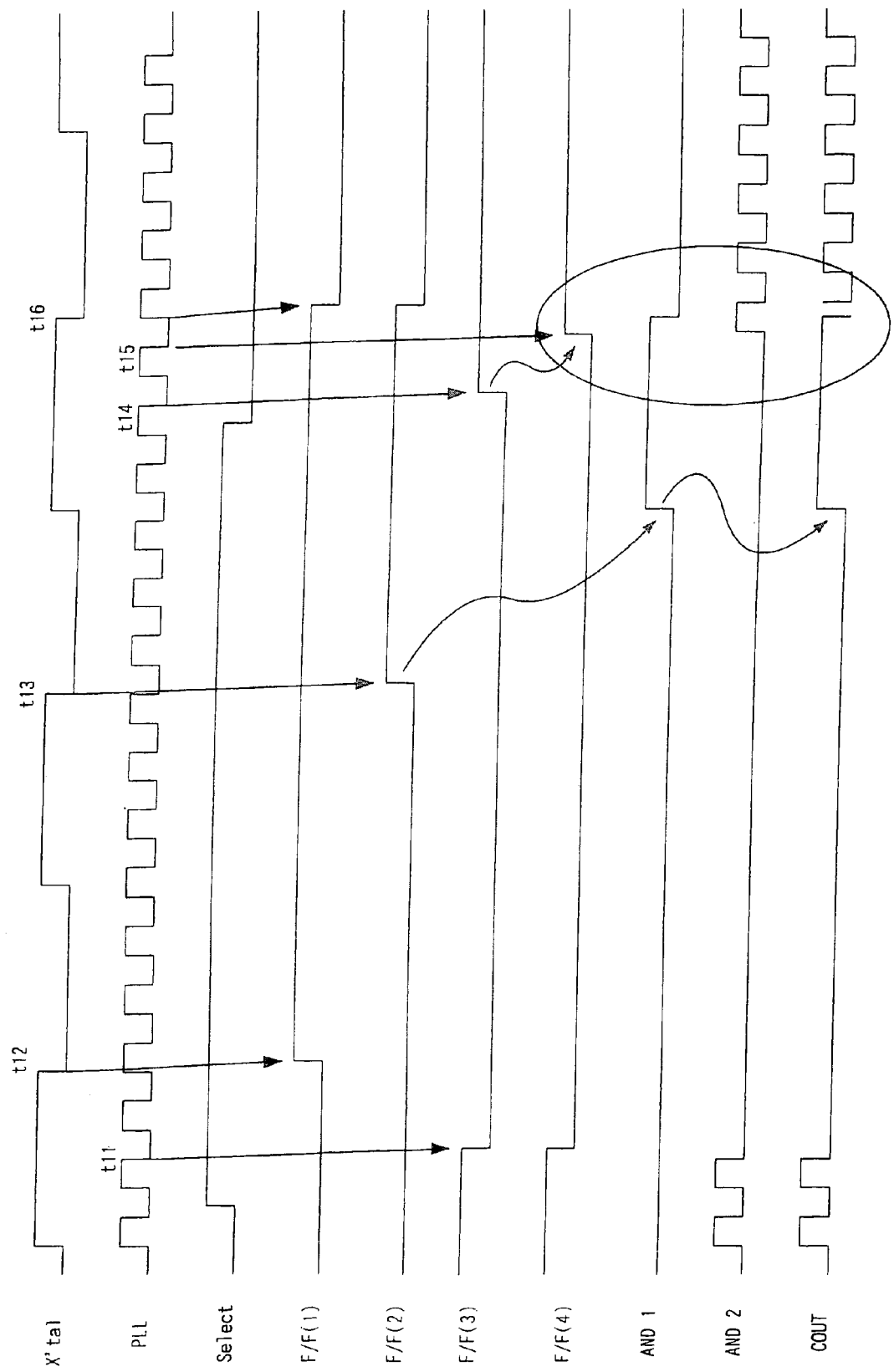
FIG. 3 is another timing chart of the operation of the clock switching circuit in FIG. 1.

On the other hand, when the switch of the interface cable 20 is set to the lower position, the frequency selection signal Freq2 is selected, and the selection circuit 52 selects the output of the second-stage flip-flop F/F(1b) and supplies it to the AND gate 18N. The second flip-flop group 45 becomes the third-stage flop—flop, and its operation is similar to the prior art shown in FIG. 1.

In this second embodiment of the invention, it is possible to select the number of stages of the second flip-flop group according to the difference in the frequency between the first clock X'tal and the second clock PLL, and it is possible to set the dead zone at the time of switching the clock to an optimum length.

With this invention, it is possible to switch between a low-speed clock and high-speed clock in response to disconnection or connection of an interface cable, without the occurrence of hazards. Moreover, when the interface cable is connected, switching waits for a stable high-speed clock to be generated before switching, so it is possible to prevent malfunctioning of the circuit that supplies the clock.

The protected range of this invention is not limited to the embodiments described above, but includes the invention and equivalent objects of the range disclosed in the claims.

What is claimed is:

1. A method for controlling a clock switching circuit, comprising:
    receiving a basic clock signal from an outside;
    receiving a PLL clock signal generated by a PLL circuit based on the basic clock signal, said PLL clock signal being faster than the basic clock;
    receiving a switch signal for switching an output from the basic clock signal to the PLL clock signal;
    inhibiting outputting the basic clock signal upon receiving a connection of an interface cable which transmits a high speed signal;
    counting a predetermined number of the PLL clock signal after inhibiting outputting the basic clock signal; and
    outputting the PLL clock signal after the number of the PLL clock signal, wherein the predetermined number is set according to the frequency difference between the basic clock frequency and the PLL clock frequency.

2. A clock signal switching circuit that switches an output from a basic clock to a fast clock comprising:
    a PLL circuit that generates said fast clock whose frequency is more than twice as much as a frequency of the basic signal; and
    an inhibiting circuit that selects said fast clock in response to a connecting of an interface cable which transmits a high speed signal and inhibits said fast clock in response to a disconnecting of the interface cable which transmits a high speed signal,
    wherein said inhibiting circuit includes:
    a first circuit for disappearing the basic clock as the output when the switching said output from said basic clock to said fast clock, and
    a second circuit for inhibiting the fast clock until the basic clock disappears through the first circuit and for allowing the output of the fast clock when the switching said output from said basic clock to said fast clock.

3. A clock signal switching circuit that switches an output from a basic clock to a fast clock comprising:
    a PLL circuit that generates said fast clock whose frequency is more than twice as much as a frequency of the basic signal; and
    an inhibiting circuit that inhibits said fast clock in response to a connecting of an interface cable within a term which depends on a difference between said frequency of said basic clock and said frequency of said fast clock in the case of switching said output from said basic clock to said fast clock,
    wherein said inhibiting circuit includes:
    a first circuit for disappearing the basic clock as the output when the switching said output from said basic clock to said fast clock, and
    a second circuit for inhibiting the fast clock until the basic clock disappears through the first circuit and for allowing the output of the fast clock when the switching said output from said basic clock to said fast clock.

* * * * *